W. A. TURBAYNE.
SYSTEM OF ELECTRICAL REGULATION.
APPLICATION FILED JAN. 24, 1920.
1,409,889.
Patented Mar. 14, 1922.
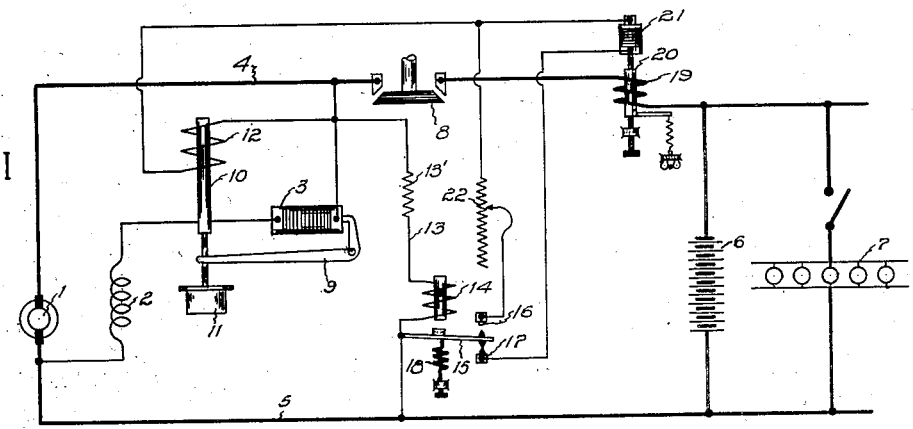
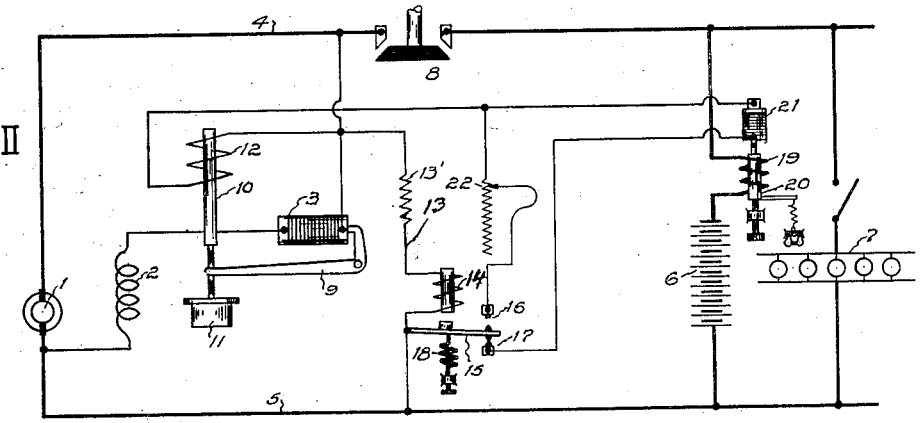
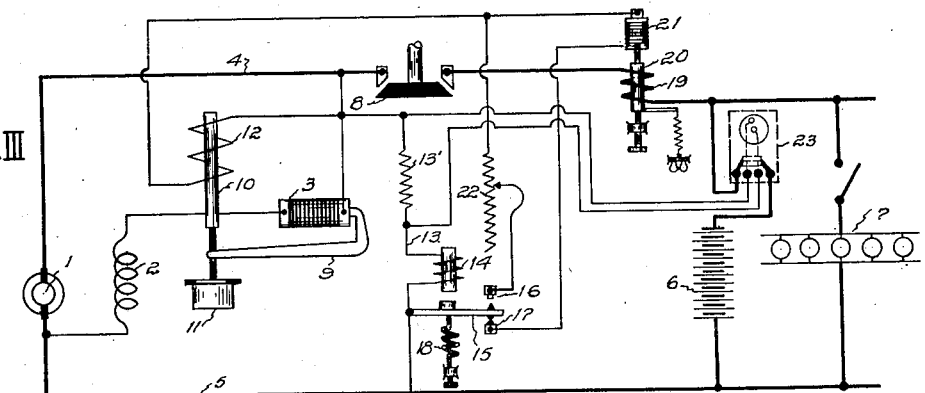
WITNESS:
Stewart Holmes.
Ralph Munden
INVENTOR.
WILLIAM. A. TURBAYNE.
BY
Raymond H. Van Vleck.
ATTORNEY.

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

SYSTEM OF ELECTRICAL REGULATION.

1,409,889. Specification of Letters Patent. Patented Mar. 14, 1922.

Application filed January 24, 1920. Serial No. 353,667.

*To all whom it may concern:*

Be it known that I, WILLIAM A. TURBAYNE, a citizen of the United States, residing at Niagara Falls, in the county of Niagara and State of New York, have invented new and useful Improvements in Systems of Electrical Regulation, of which the following is a specification.

The present invention relates to systems of electrical regulation.

The invention is particularly applicable to the regulation of generators such as are used in railway and automobile lighting systems wherein the generator is employed to charge a storage battery and supply a lamp or other load. When the generator is at rest or operating at low speed, the battery supplies the load.

In such systems it is sometimes desirable to regulate the generator in response to the total generator current or in response to battery current until predetermined electrical conditions have been attained, and thereafter, to regulate so as to maintain a substantially constant voltage, regardless of either speed changes or changes in the demands on the load circuit.

An object of the invention is to provide improved regulating means for a variable speed generator which will maintain constant current under certain conditions and constant voltage under other conditions.

A further object is to provide regulating means for variable speed generators which will permit the generator to deliver the full output of which it is capable, uninfluenced by the regulator, until a predetermined maximum current is reached and which will thereafter hold said maximum current at a practically constant value.

A further object is to provide improved current regulating means for the generator in systems employing a storage battery, which will be free of the objectionable feature that discharging current from the battery will interfere with the proper building up of the generator.

A further object is to provide regulating means for variable speed generators which may be readily adjusted relative to both its current and voltage characteristics.

A further object is to provide a system involving a variable speed generator with regulating means whereby said generator will deliver a substantially constant current under certain conditions and hold a substantially constant voltage under other conditions, said regulating means being capable of adjustment whereby to vary either the current or the voltage characteristics without disturbing the adjustment of other characteristics.

Referring to the drawings:

Fig. 1 represents one embodiment of the present invention.

Fig. 2 represents a modified embodiment.

Fig. 3 represents an embodiment of the present invention wherein means is provided for changing from current to voltage regulation in response to the net input of current into the battery.

Referring first to Fig. 1, the variable speed generator is illustrated with the armature 1 and a field winding 2, said field winding 2 being connected across the terminals of the armature 1 through a regulator 3, which is illustrated in the form of a compressible rheostat. The armature 1 supplies leads 4 and 5 across which are connected the storage battery 6 and a translation circuit 7. It need not be explained that the translation circuit 7 may be provided with any preferred means for regulating the voltage impressed upon the translation devices.

An automatic switch 8 is provided for connecting the armature 1 to the storage battery 6 when said armature 1 is developing a predetermined voltage. This voltage will be chosen at a value substantially equal to the C. E. M. F. of the battery 6. The details of the automatic switch 8 need not be explained herein, it being sufficient to state that it will be provided with the usual lifting and holding coils which are very familiar to all those skilled in the art.

Regulation of the generator is provided for by control of the resistance of the rheostat 3 which is in the field circuit of the variable speed generator. The construction of the rheostat 3 may take a variety of forms. A very simple construction is illustrated in the drawings involving a compressible pile operated upon by bell crank lever 9. Said bell crank lever 9 moves in response to a magnetic core 10 and may have its movement damped by a dash-pot 11. The core 10 moves in response to the energization of the solenoid 12, the novel connections of which constitute the subject of the present invention.

Connected across the mains 4 and 5 is a circuit 13 including a fixed resistance 13' and a solenoid 14, which solenoid controls a switch 15. The switch 15 is adapted to engage selectively with a pair of contacts 16 and 17. Said switch 15 is biased by spring 18 to a position in engagement with contact 17. Arranged in the lead 4 is a solenoid 19 operating a core 20, which core 20 is adapted to vary the resistance of an auxiliary compressible pile 21. The core 20 will be biased to a position to cause the resistance of the auxiliary compressible pile 21 to be a maximum. Energization of solenoid 19 above a predetermined value, will result in a compression of the pile 21 to decrease the resistance thereof.

Two alternate circuits through solenoid 12 are provided across leads 4 and 5. Starting from the lead 5, circuit may be traced from switch 15, contact 17, compressible pile 21, through solenoid 12 to the lead 4. When switch 15 is in its uppermost position, in engagement with contact 16, circuit may be traced from lead 5 through switch 15, contact 16, adjustable resistance 22, through solenoid 12 to the lead 4. It will be clear that one or the other of the circuits just traced will be connected, depending upon the position of the switch 15, which in turn is dependent upon the energization of the solenoid 14.

A mode of operation of the system disclosed in Fig. 1 is substantially as follows: Starting with the generator at rest the automatic switch will be open and consequently solenoid 19 will be de-energized, so that the compressible pile 21 will have maximum resistance. At this time the switch 15 will be in its lowermost position, whereby to close the circuit which includes said compressible pile 21 and the operating solenoid 12. The energization of solenoid 12 will therefore be a minimum at this time, whereby the compressible pile 3 will have minimum resistance. The generator will rapidly build up and deliver maximum output at a low speed. When predetermined voltage conditions are reached across the generator terminals, the automatic switch will close. Current will now flow from the generator to the storage battery and through the translation circuit, if said translation circuit is connected in circuit. Current in passing through the outside circuit of the generator, will pass through solenoid 19. Core 20 will be so adjusted that it will not be raised by solenoid 19 until a predetermined energization of solenoid 19 is attained which represents the maximum current flow which it is desired to permit. Up to this point, therefore, the generator is uninfluenced by the regulator and is free to develop its full output. Upon tendency to exceed the maximum output, the auxiliary pile 21 will have its resistance decreased, whereby to increase the effect of the operating solenoid 12 so that the main rheostat 3 will respond to vary the field excitation and hold constant the current delivered by the generator, regardless of variations in generator speed or electrical conditions of the system.

The continued charging of the battery will cause a gradual rise in the voltage of the system, due to the gradually rising C. E. M. F. of the battery. According to the system disclosed in Fig. 1, when the voltage across the system reaches a predetermined value, the solenoid 14 will be sufficiently energized to attract the switch 15, thus open-circuiting the compressible pile 21 and closing circuit through adjustable resistance 22 and operating coil 12, across the leads 4 and 5. Thereafter the solenoid 19 is ineffective to control the regulation of the generator, said regulation being responsive only to the the variations of the operating solenoid 12, which is connected directly across leads 4 and 5, through the fixed adjustable resistance 22. Said operating solenoid 12 therefore maintains constant voltage across the system. The standard of regulation may be varied by varying the resistance 22 to hold any desired voltage on the system. In practice, this voltage will be chosen at a value which will cause the battery to float across the line.

Figure 2 represents a modification in which the operating solenoid for the auxiliary compressible pile 21 is connected in the battery branch. The system illustrated in Fig. 2 provides for regulation of the generator in response to battery current and thus holds a substantially constant charging current until a predetermined voltage is reached across the system, at which point the voltage responsive solenoid 14 operates as described in the system illustrated in Fig. 1. In the system illustrated in Fig. 2, the generator current will be permitted to vary to take care of variations in the demand of the lamp circuit.

Fig. 3 illustrates a system involving means for changing from current to voltage regulation in response to the net input to the storage battery. According to Figure 3, an ampere hour meter is connected in the battery branch, which ampere hour meter is indicated by the numeral 23. Said meter 23 should be of the type which changes its rate of registration upon change of direction of current flow therethrough. Such an ampere hour meter may be calibrated to compensate for the fact that the efficiency of a storage battery is less than 100%, whereby said ampere hour meter will indicate at all times the state of charge of the battery. Said ampere hour meter will be provided with contacts which may short circuit the resistance 13' in circuit with the relay solenoid 14. The value of the resistance 13' in Fig. 3 will be chosen sufficiently great to prevent the relay solenoid 14 from operating at any voltage which may be reached in the normal operation of the system. When this resistance 13' is short circuited, however, due to engagement of the contacts of the ampere hour meter 23, the relay solenoid 14 will be sufficiently energized to cause the engagement of switch 15 with contact 16 and thus render effective the voltage regulating means in a manner which will be clear from the description of Figs. 1 and 2.

By the compression of the auxiliary compressible pile 21, the generator current does indirectly affect the voltage of the main regulator. The auxiliary compressible pile 21 may therefore be made relatively small and of great sensitiveness. The adjustment of the compressible pile 21 with its operating parts, is such that no movement of the plunger 20 is brought about until the normal current in solenoid 19 is reached. Consequently, the generator will be caused to rapidly build up and to deliver its full output without interference.

When the system is arranged to regulate in response to the battery current, as in Fig. 2, the auxiliary compressible pile 21, with its operating parts, is so adjusted that current from the battery to supply the translation circuit is insufficient to raise the plunger 20 and therefore discharging battery current has no effect on the regulator.

The present invention has the advantage that the auxiliary compressible pile 21 and its operating parts, may be adjusted independently of the adjustable resistance 22, whereby one of these elements may be adjusted without disturbing the adjustment of the other. That is to say, the value of current desired to be held constant may be varied without affecting the value of voltage to be held constant, and vice versa.

The described embodiments of the present invention have been chosen merely for the purpose of illustration and should not be considered in a limiting sense. Many modifications will occur to those skilled in the art. It is intended in this patent to cover all such modifications that come within the scope of the invention as defined by the appended claims.

What I claim as new and desire to secure by Letters Patent of the United States is—

1. An electric system of generation and regulation including a variable speed generator, a regulating medium for controlling the field thereof, an electro-magnetic winding for controlling said medium, alternative circuits for said winding and selective means for automatically connecting said winding in one or the other of said circuits.

2. An electric system of generation and regulation including a variable speed generator, a regulating medium for controlling the field thereof, an electro-magnetic winding for controlling said medium, alternative circuits for said winding and selective means for automatically connecting said winding in one or the other of said circuits, one of said circuits being responsive to the voltage across said system, the other of said circuits being responsive to a function of the current flow in said system, said selective means being biased to connect said winding in said current responsive circuit.

3. A regulator for a variable speed generator including in combination with the generator field a regulating medium for varying the excitation of said field, a controlling winding for said medium, connections for connecting said winding across said generator in two alternative circuits, one of said alternative circuits being provided with controlling means to render said circuit responsive to the current flow in one of the outside circuits for said generator and selective means for connecting said winding in one or the other of said alternative circuits.

4. A regulator for a variable speed generator including in combination with the generator field a regulating medium for varying the excitation of said field, a controlling winding for said medium, connections for connecting said winding across said generator in two alternative circuits, one of said alternative circuits being provided with controlling means to render said circuit responsive to the current flow in one of the outside circuits for said generator and selective means for connecting said winding in one or the other of said alternative circuits, said selective means being biased to close one circuit.

5. A regulator for a variable speed generator including in combination with the generator field a regulating medium for varying the excitation of said field, means adapted to be connected across said generator in two alternative circuits for controlling said medium, current responsive means in one of said alternative circuits to cause said first mentioned means to regulate in response to current variations, and selective means for closing one or the other of said alternative circuits.

6. In a system of electrical distribution, a variable speed generator and regulating means therefor, said regulating means including a rheostat in the field circuit of said generator, a winding for controlling said rheostat, said winding being adapted to be connected across said generator in either of two alternative circuits, current responsive means adapted to control one of said circuits upon predetermined current flow, and selective means for closing one or the other of said alternative circuits.

7. In a system of electrical distribution, a variable speed generator and regulating means therefor, said means comprising two alternative circuits connected across said generator, means for rendering one of said alternative circuits responsive to current changes in a circuit supplied by said generator and selective means for connecting one or the other of said alternative circuits across said generator.

8. An electric system of generation and regulation including a variable speed generator, a regulating medium for controlling the field thereof, an electro-magnetic winding for controlling said medium, alternative circuits for said winding and selective means for automatically connecting said winding in one or the other of said circuits, one of said circuits being responsive to the voltage across said system and the other of said circuits being responsive to a function of the current flow in said system.

9. In a system of electrical distribution, a variable speed generator and regulating means therefor, said means comprising a variable resistance and two alternative circuits for controlling said resistance, one of said circuits being directly connected across the system whereby said regulator may respond to voltage changes in the system, and selective means for completing one or the other of said alternative circuits.

10. In a system of electrical distribution, a variable speed generator and regulating means therefor, said means comprising a variable resistance and two alternative circuits for controlling said resistance, one of said circuits being directly connected across the system whereby said regulator may respond to voltage changes in the system, the other circuit including means causing said regulator to respond to current changes in the system, and selective means for completing one or the other of said alternative circuits.

In witness whereof, I have hereunto subscribed my name.

WILLIAM A. TURBAYNE.